C. R. DUGGAN.
SPIRAL TOOL DRIVER.
APPLICATION FILED MAR. 30, 1914.
1,188,162.  Patented June 20, 1916.
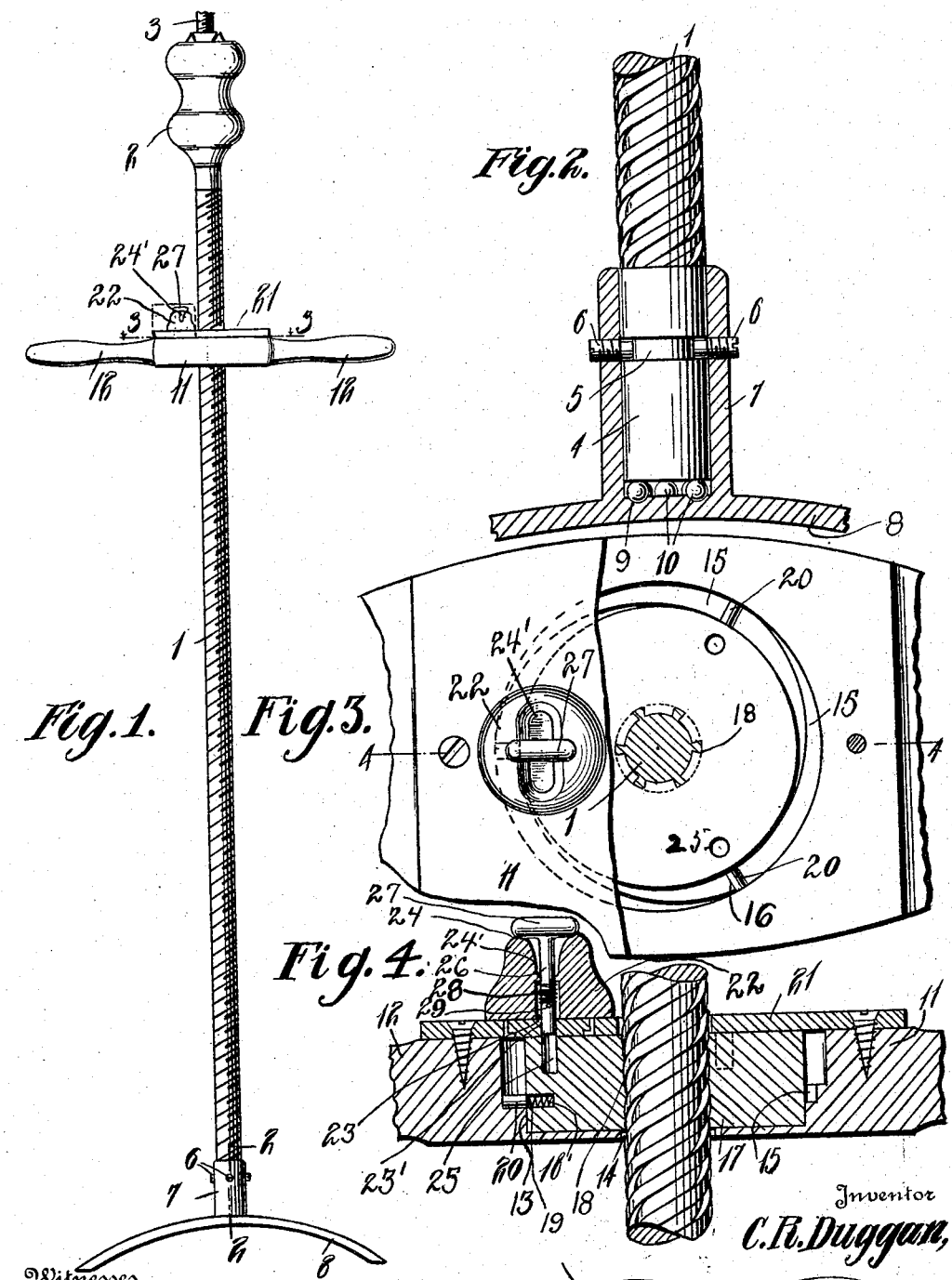

UNITED STATES PATENT OFFICE.

CLAUDE R. DUGGAN, OF HUNTSBURG, OHIO.

SPIRAL TOOL-DRIVER.

1,188,162. Specification of Letters Patent. Patented June 20, 1916.

Application filed March 30, 1914. Serial No. 828,299.

*To all whom it may concern:*

Be it known that I, CLAUDE R. DUGGAN, a citizen of the United States, residing at Huntsburg, in the county of Geauga, State of Ohio, have invented certain new and useful Improvements in Spiral Tool-Drivers; and I do hereby declare the following to be a full, clear, and exact description of the invention, such as will enable others skilled in the art to which it appertains to make and use the same.

The present invention relates to improvements in spiral tool drivers, and has for its object to provide a strong and durable device of this character that is simple in construction, efficient in operation and may be manufactured at a comparatively low cost.

A further object of the invention resides in the provision of a device of the above character in which independently operable means are embodied whereby the shank engaging member thereof may be locked against rotation with respect to the handle.

With these and other objects of similar nature in view, the invention consists in the construction, combination and arrangement of parts set forth in and falling within the scope of the appended claim.

Figure 1 is a plan view of the tool. Fig. 2 is a sectional view on line 2—2 of Fig. 1. Fig. 3 is a similar view on line 3—3 of Fig. 1. Fig. 4 is a similar view on line 4—4 of Fig. 3.

Referring to the drawing, the numeral 1 designates a shank, which is screw threaded throughout its length, and has one of its ends provided with a chuck 2 for detachably engaging the drills or bits 3. The other end of the shank terminates in a cylindrical head 4 having formed therein an annular groove 5 which is engaged by the inner ends of the set screws 6, said set screws being engaged in the casing 7 which is formed integral with the breast plate 8. The breast plate 8 is provided with race 9 in which are engaged balls 10, said balls being engaged by the outer end of the head 4 so that the shank 1 may rotate with a minimum amount of friction. By providing the set screws 6 and annular groove 5 accidental disengagement of the head 4 from the casing 7 is prevented. Mounted for reciprocation longitudinally of the shank 1 is a stock 11, the same having formed integral with its ends, handles 12, which are grasped by the user to reciprocate the stock. The stock 11 is provided with a central recess 13 having opening thereinto the aperture 14 so that the stock may pass over the shank 1. The recess has formed therein cam surfaces 15 which terminate in shoulders 16, the purpose of which will appear later.

Rotatably mounted in the recess 13 is a sleeve 17 which has its bore 18 threaded for engagement with the threads of the shank 1. The sleeve 17 is provided with a plurality of sockets 18' which have mounted therein coil springs 19 which are engaged by the inner ends of the pins 20, the outer ends of said pins being adapted to engage the cam surfaces 15 or the shoulders 16, according to the direction in which the stock is being moved. To retain the sleeve 17 in place, the outer surface of the stock 11 is provided with a detachable plate 21.

Thus it will be seen that when the stock 11 is moved in one direction, the pins 20 will ride over the cam surfaces 15 and will successively engage each cam surface, but when the stock is moved in an opposite direction the pins will engage the shoulders 16, which action causes the shank 1 to rotate, thus when the operator is holding the bit 3 in engagement with the work, upon leaning with the chest upon the breast plate 8, the boring operation may be readily effected.

When, as is often the case, it is found difficult to remove the bit from the work it will be necessary to lock the sleeve 17 against rotation in both directions with respect to the stock 11. To accomplish the locking of these parts there is mounted on the plate 21 a knob or projection 22, said knob being provided with an opening 23 registering with a similar opening 23' in the plate 21, and being further formed with relatively shallow and deep notched portions 24 and 24'. Slidably mounted in the openings 23 and 23' and insertible within one of the openings 25 in the plate 17, is a locking pin 26, said pin being formed with an enlarged head 27 alternately engageable in the notched portions 24 and 24' to hold said pin out of, or permit of its insertion into one of the openings 25, to lock or unlock the sleeve 17 to or from the stock 11.

A spring 28 is disposed in the opening 23 of the knob, said spring bearing against the shoulder formed therein and against the transverse pin 29 in the locking pin 26, and normally urging said pin 26 to its locking position. Thus when it is desired to remove the bit from the work, the sleeve 17 is locked against rotation with respect to the stock 11 so that reciprocation of the latter will rotate the bit first in one direction and then in the other whereby to loosen same and permit its convenient withdrawal.

What is claimed is:—

A tool of the class described comprising a threaded shank having a bit chuck fixed to one end thereof and a breast plate revolubly connected with its other end, a stock arranged for reciprocation upon the shank and provided with a circular recess, a sleeve rotatably mounted in the recess threaded to receive said shank, ratchet teeth formed in the side wall of the recess, spring pressed dogs carried by the sleeve to engage said ratchet teeth and lock the sleeve against rotation in one direction, a plate removably secured to the stock to close said recess, and a pin carried by the plate and engageable in openings in said sleeve to lock same against rotation in both directions.

In testimony whereof, I affix my signature, in the presence of two witnesses.

CLAUDE R. DUGGAN.

Witnesses:
F. B. MOREHOUSE,
GLADYS E. HUGHES.

Copies of this patent may be obtained for five cents each, by addressing the "Commissioner of Patents Washington, D. C."